United States Patent [19]

Brane et al.

[11] Patent Number: 4,466,457

[45] Date of Patent: Aug. 21, 1984

[54] BYPASS AND HARD WATER MIX VALVE

[76] Inventors: Earl P. Brane, 9470 Ulmerton Rd., Largo, Fla. 33541; Douglas K. Brane, 3 N. Pine Cir., Belleair, Fla. 33516; Hilton H. Hammond, 6644 Gulfport Blvd., St. Petersburg, Fla. 33707

[21] Appl. No.: 350,069

[22] Filed: Feb. 18, 1982

[51] Int. Cl.³ ............................................. F16K 11/18
[52] U.S. Cl. .............................. 137/599.1; 137/599.2; 137/625.29; 137/625.43
[58] Field of Search ............... 62/599.1, 599.2, 625.29, 62/625.43

[56] References Cited

U.S. PATENT DOCUMENTS 4,130,133 12/1978 Sullivan ............................ 137/599.1
4,250,920 2/1981 Traylor .......................... 137/625.29

*Primary Examiner*—Ronald C. Capossela
*Attorney, Agent, or Firm*—Woodard, Weikart, Emhardt & Naughton

[57] ABSTRACT

A valve device for directing hard water past a softening means and for further mixing hard water with soft water. A double headed first valve is slidably mounted within the tubular shaped main body of the valve device and is separated internally therefrom forming a bypass passage extending from the hard water inlet to the main outlet. An external control knob is operable to move the valve from the closed position to an open position. A second valve extends through the first valve and is movable by a second control to and from the first valve to allow hard water to pass through the closed first valve from the hard water inlet to the soft water outlet to control mixing of hard water with soft water.

15 Claims, 5 Drawing Figures

BYPASS AND HARD WATER MIX VALVE

BACKGROUND OF THE INVENTION

This invention is in the field of valves for controlling the flow of water. Valves are used to divert water from flowing into a soft water tank when it is desired to repair the tank or simply bypass the soft water process thereby providing for a hard water output. Valves in the input and output lines to the soft water tank along with an additional valve in the bypass line between the input and output lines are utilized in order to bypass the soft water tank. Disclosed herein is a bypass device which utilizes a single valve to achieve the bypass procedure. Further, a hard water mix valve is included in the device in order to allow for a portion of the hard water flowing into the device to pass to the soft water tank while another portion passes to the soft water outlet thereby allowing the user to control the amount of hardness of the water flowing outward from the soft water tank. It is known to control the hardness of water by suitable valving; however, the device disclosed herein provides a new and improved valve for simultaneously providing for bypass control as well as hard water mixing.

SUMMARY OF THE INVENTION

One embodiment of the present invention is a bypass and first water mix valve comprising a main body having an inlet passage with a first end connectable to a source of hard water and a second end connectable to a water softening means, the main body further having an outlet passage connectable to the water softening means and an intermediate passage leading from the inlet passage between the first end and second end to the outlet passage, bypass valve means slidably mounted in the intermediate passage being operable to move from a closed position to an open position whereat all water flowing into the inlet passage from the first end is directed through the intermediate passage to the outlet passage; and, first water mix valve means movably mounted in the intermediate passage and operably associated with the bypass valve means to release controlled portions of water from the inlet passage through the intermediate passage to the outlet passage when the bypass valve is in the closed position.

Another embodiment of the present invention is a water valve comprising a main body with a first water inlet, a first water outlet, a second water inlet, a main outlet, a first water passage leading from the first water inlet to the first water outlet, a second water passage leading from the second water inlet to the main outlet, and a bypass passage leading from the first water passage to the second water passage, a bypass valve including a hollow tube with a first seal at one end thereof, the tube slidably mounted in the bypass passage and movable from a closed position whereat the seal engages the main body at the bypass passage interrupting flow therethrough to an open position whereat the seal engages the main body at the first water passage interrupting flow through the first water outlet and directing flow to the bypass passage; and, a first water mix valve slidably mounted in the tube and movable, when the tube is in the closed position, from a sealing postion interrupting flow through the tube to an unsealed position directing a portion of water in the first water passage through the tube.

It is an object of the present invention to provide a new and improved valve having a capability to mix a controlled portion of hard water with soft water flowing from a soft water tank.

A further object of the present invention is to provide a new and improved bypass and hard water mix valve.

Yet another object of the present invention is to provide a combined valve to control water flow past a soft water tank and to control the hardness of water flowing from the tank.

Related objects and advantages of the present invention will be apparent from the following description.

DESCRIPTION OF THE PREFERRED EMBODIMENT

Figure 1:
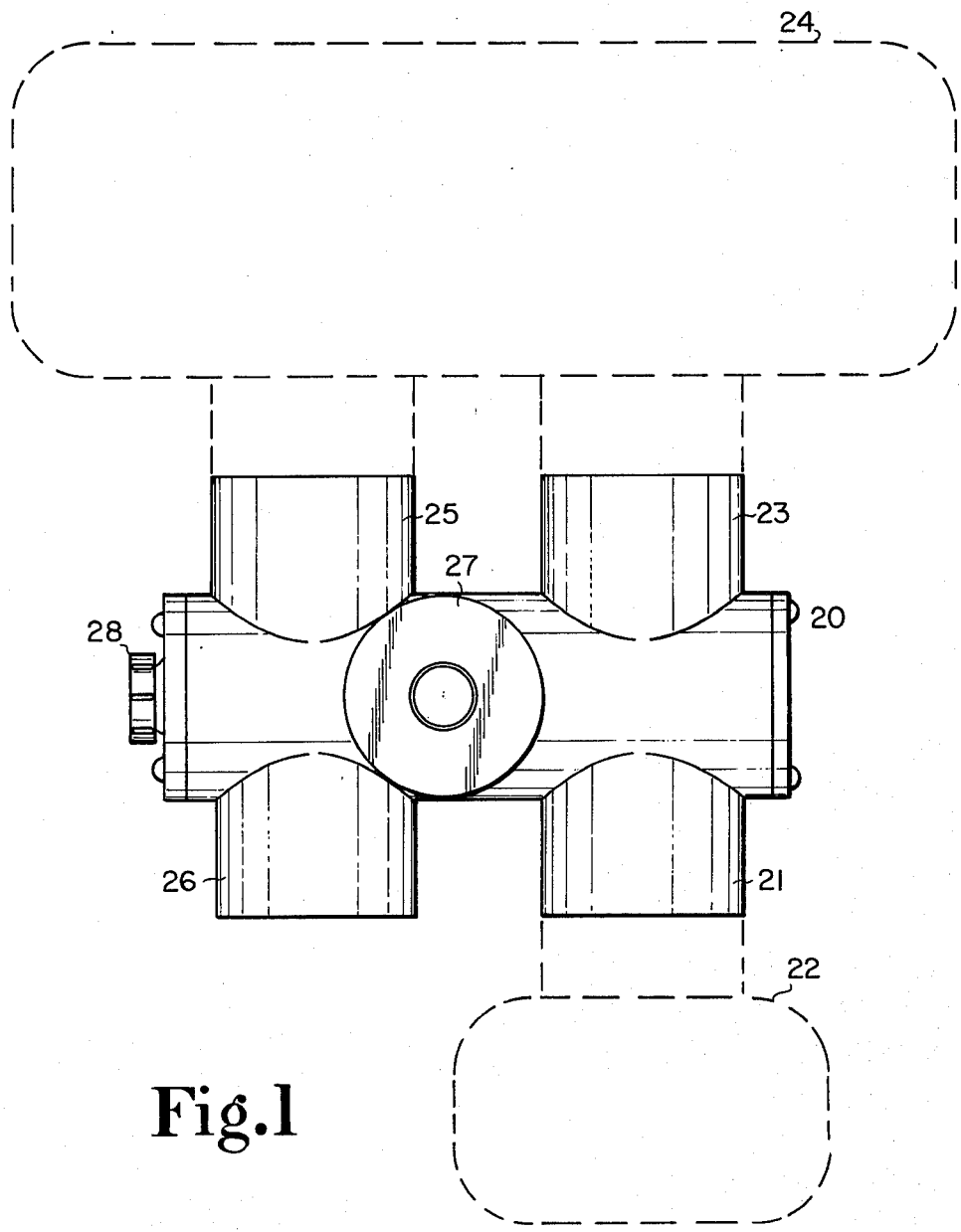
FIG. 1 is a view of the valve device connected to a source of hard water and a soft water tank.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown the valve device 20 incorporating the present invention. Device 20 includes a hard water inlet 21 connected to a source of hard water 22. Further, valve device 20 is connected to a softening device or soft water tank 24 with the hard water flowing from the device 20 via hard water outlet 23 connected to tank 24. Soft water provided from tank 24 flows into soft water inlet 25 of device 20 and then out through the main outlet 26. A control knob 27 is provided to direct all of the incoming hard water flowing into inlet 21 immediately to outlet 26 thereby bypassing tank 24. A second control 28 is provided to allow a portion of the hard water flowing into inlet 21 to mix with the soft water entering device 20 via inlet 25 and to then flow outward from the device via outlet 26. Control 28 is adjustable to control the amount of hard water mixed with the soft water flowing from the tank 24 providing for control of the hardness of water.

Figure 2:
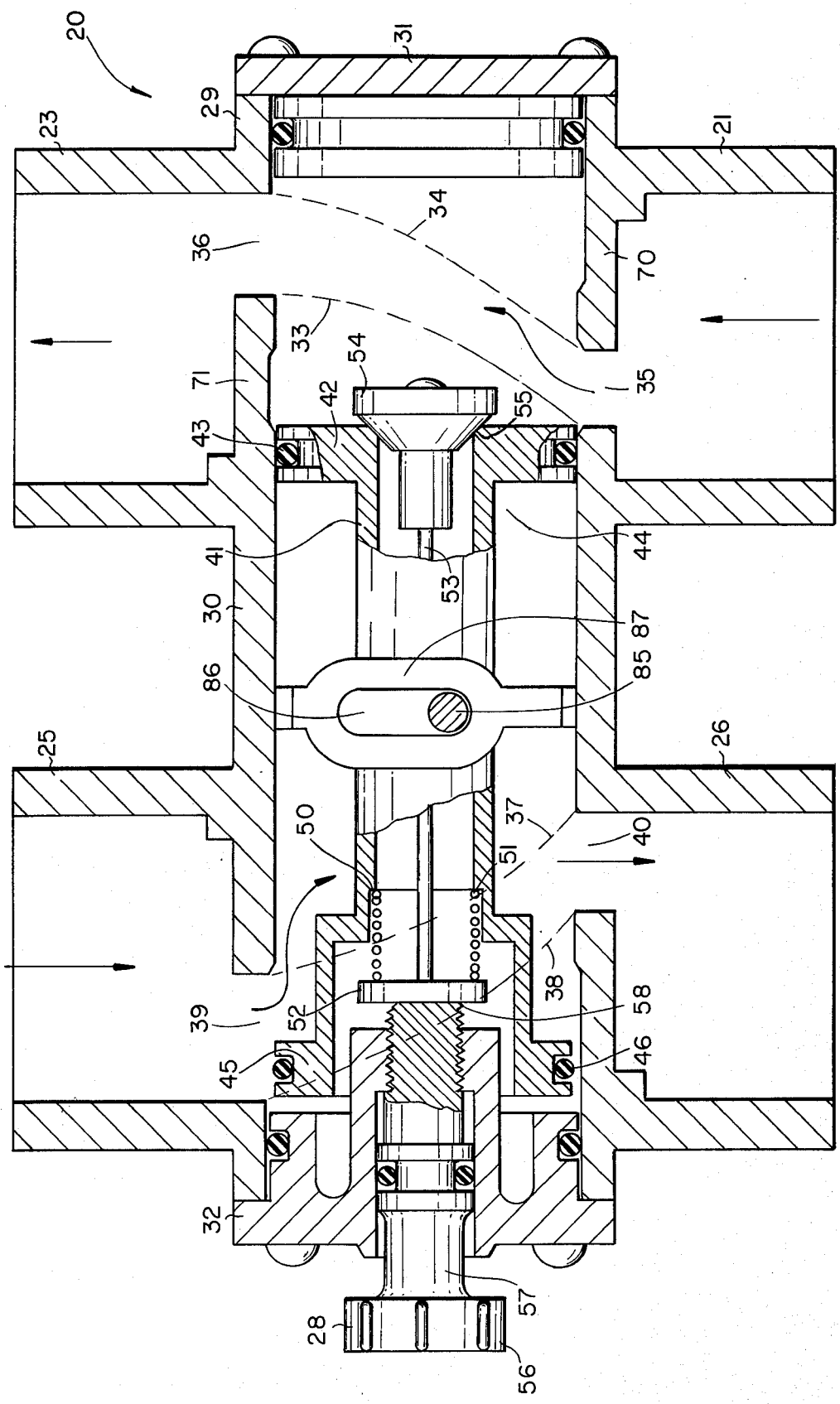
FIG. 2 is an enlarged fragmentary cross-sectional view of the valve device of FIG. 1 with the bypass valve and the hard water mix valve both in a closed position.

Valve device 20 includes a main body 29 (FIG. 2) produced from plastic or other suitable material. Main body 29 has integrally formed thereon the cylindrical and aligned hard water inlet 21 and hard water outlet 23. Likewise, soft water inlet 25 is aligned with main outlet 26 with both being cylindrical in configuration. The four inlets and outlets each open into a cylindrical bypass tube 30 formed by the walls of main body 29. Tube 30 is capped at the opposite ends thereof by end caps 31 and 32 sealingly secured thereto by screws or other suitable fastening devices.

A hard water passage shown by imaginary lines 33 and 34 extends between the offset apertures 35 and 36, respectively, of inlet 21 and outlet 23. Likewise, a soft water passage shown by imaginary lines 37 and 38 extends between the offset apertures 39 and 40, respectively, of inlet 25 and outlet 26.

Bypass valve is a hollow tube 41 having a disc-shaped plate 42 fixedly mounted to one end of the tube with a conventional O-ring seal 43 surrounding plate 42 and in sealing engagement with the inner surface of bypass tube 30 preventing flow of water into the bypass tube. Tube 41 is spaced apart from the interior surface of tube 30 forming a bypass passage 44. Movement of tube 41 along with plate 42 from a position shown in FIG. 2 to the position shown in FIG. 4 allows for the flow of all of the water entering aperture 35 into bypass passage 44 which in turn leads to aperture 40 of main outlet 26.

Figure 4:
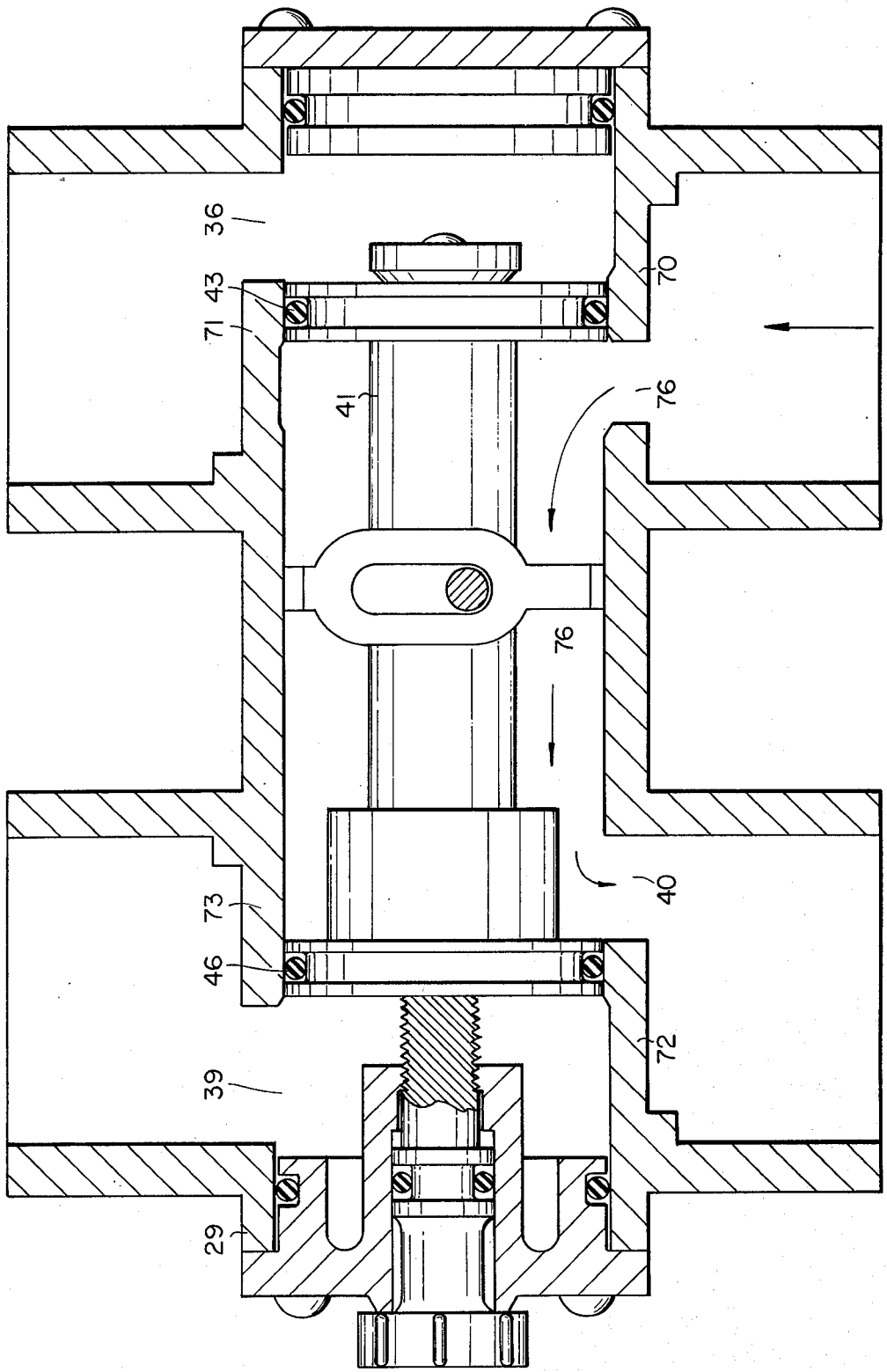
FIG. 4 is the same view as FIG. 2 only showing the bypass valve in an open position and the hard water mix valve in a closed position.

Attached to the end of tube 41 opposite plate 42 (FIG. 2) is a ring 45 having a conventional O-ring seal 46 mounted to the periphery thereof. O-ring seal 46 prevents the flow of water from aperture 39 to aperture 40 when the tube is moved to the right or open position as shown in FIG. 4. Tube 41 is provided with a seat 50 receiving a helical spring 51 in turn contacting at its opposite end disc 52 integrally mounted to stem 53 having at its opposite end a valve head 54 sealingly received by a valve seat 55 provided in plate 42. The length of stem 53 is such that spring 51 normally urges valve head 54 into sealing engagement with the valve seat 55 thereby preventing liquid flow into tube 41 from the hard water passage shown by lines 33 and 34. Tube 41 forms a hard water mix passage leading from the hard water inlet 35 to the main outlet 40.

Figure 5:
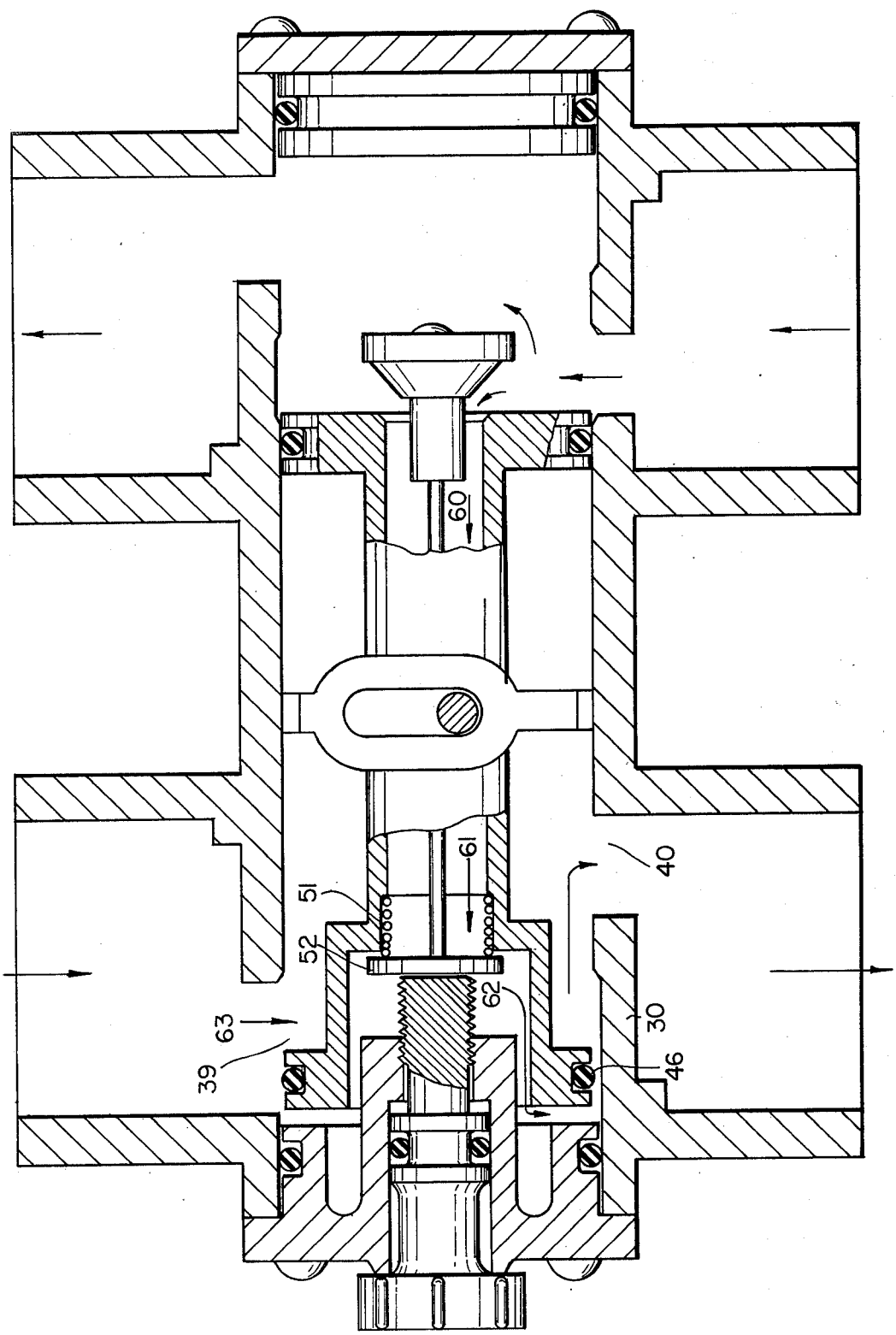
FIG. 5 is the same view as FIG. 2 only showing the bypass valve in a closed position and the hard water mix valve in an open position.

Control 28 (FIG. 2) includes a knob 56 mounted to threaded shaft 57 in meshing engagement with internal threads provided on cap 32. The inner end 58 of shaft 57 contacts disc 52. Thus, when bypass valve is in the closed position shown in FIG. 2, and with knob 56 positioned in its most outward position, valve head 58 will seat on valve seat 55. As knob 56 is turned causing end 58 to move inwardly, disc 52 will compress spring 51 causing valve 54 to leave seat 55 thereby directing a portion of the water flowing into exit 35 into the hard water mix passage within tube 41. By continuing to rotate knob 56, valve 54 will be moved farther from seat 55 by allowing even greater flow into the hard water mix passage. Water flowing into tube 41 will continue to flow in the direction of arrows 60 (FIG. 5), passing through spring 51 beneath disc 52 as shown by arrow 61 and eventually, as shown by arrow 62, between the O-ring seal 46 and the main body 30 of the device. The hard water will flow out through aperture 40 while mixing with the soft water flowing through aperture 39 in the direction of arrow 63. Thus, the hard water mix valve is slidably mounted within tube 41 and is movable when the bypass valve is located in the closed position. The hard water mix valve is movable from a sealing position shown in FIG. 2 whereby flow is interrupted through tube 41 to an unsealed position shown in FIG. 5 whereat a portion of the water from the hard water passage defined by imaginary lines 33 and 34 are directed into the hard water passage within tube 41 eventually exiting via outlet 40. The spring 51 is positioned between the mix valve and bypass valve to normally urge valve head 54 against seat 55. Control knob 56 and shaft 57 provides an adjustable control means which projects from but is mounted to the main body of the device 20 and is operably associated with spring 51 to move valve head 54 on and off seat 55 to control the exact amount of hard water flow through tube 41. When the bypass valve is in the open or right position shown in FIG. 4, then valve 54 is always seated upon valve seat 55.

Main body 29 includes a pair of oppositely projecting walls 70 and 71 (FIG. 2) forming the offset apertures 35 and 36. The distal end of wall 70 is positioned beneath the distal end of wall 71. As a result, the bypass valve when in the open or right position shown in FIG. 4 interrupts the hard water passage shown by imaginary lines 33 and 34 with O-ring 33 contacting the inner surface of the distal end of wall 71 and the inner surface of the distal end of wall 70. All of the hard water entering aperture 35 then flows into bypass passage 44 in the direction of arrow 76. Likewise, a second pair of oppositely projecting walls 72 and 73 is provided forming the offset apertures 39 and 40 (FIG. 4). With the bypass valve positioned in the open position, O-ring seal 46 contacts the inner surfaces of the distal ends of walls 72 and 73 interrupting flow through the soft water passage shown by imaginary lines 37 and 38 (FIG. 2) and insuring the flow of all the hard water within hard water passage 44 through main outlet 40. The bypass valve is slidably mounted in the bypass passage 44 and is movable from the closed position shown in FIG. 1 whereat seal 43 engages main body 29 at the start of the bypass passage 44 interrupting flow therethrough to the open position shown in FIG. 4 with seal 43 engaging the main body at the location of the hard water passage interrupting flow through the hard water outlet 36 and directing the flow instead through the bypass passage 44 as shown by arrow 76. Seal 46 engages the main body 29 of the device at the location of the soft water passage shown by imaginary lines 37 and 38 (FIG. 2) when the bypass valve is in the open position (FIG. 4) interrupting flow through the soft water inlet 39 and directing flow from the bypass passage 44 into the soft water passage and then out via outlet 40. In order to prevent tube 41 (FIG. 2) from spinning or rotating within tube 30, suitable ribs may be provided on tube 41 to slide in complementary slots on tube 30.

Figure 3:
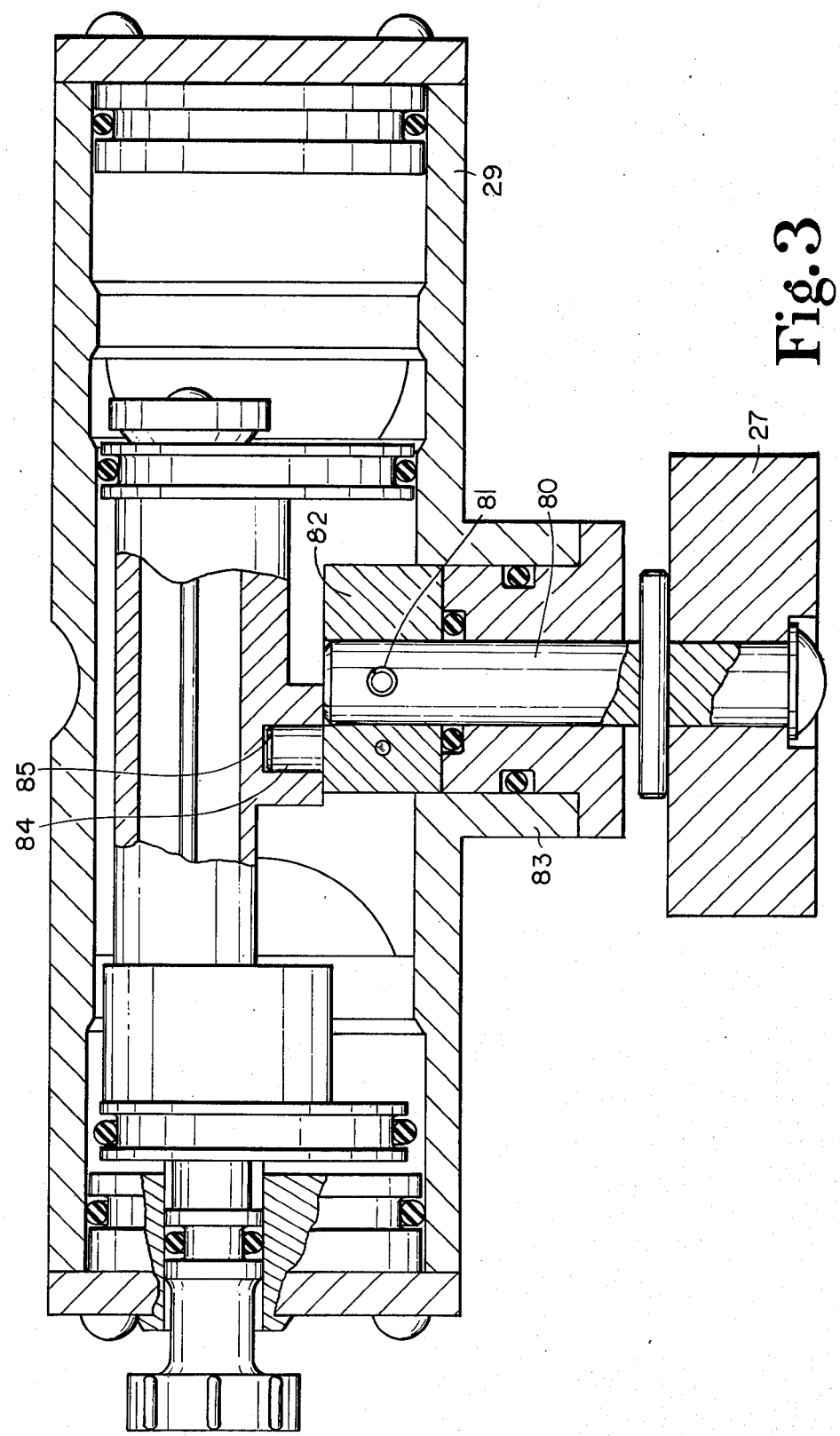
FIG. 3 is a fragmentary top view of the device of FIG. 2.

The bypass control (FIG. 3) includes a knob 27 fixedly mounted to shaft 80 in turn pinned by pin 81 to a rotatable bushing 82 rotatably mounted by shaft 80 to boss 83 formed on main body 29. A second pin 84 is fixedly secured to the distal end of bushing 82 and is located off-center relative to the center line of shaft 80. The free end 85 of pin 84 is slidably received in slot 86 (FIG. 2) formed by guide 87 fixed secured by ribs or other suitable means to tube 41. Thus, as control knob 27 is rotated clockwise as, viewed in FIGS. 2 and 3, pin 84 will move upwardly in slot 86 eventually causing guide 87 and tube 41 to move to the right as pin 84 is rotated around shaft 80. Continued rotation of control knob 27 will cause pin 84 to ride down in slot 86 moving the bypass valve to the extreme right or open position shown in FIG. 4. Thus, in the closed position FIG. 2 and the open position FIG. 4 of the bypass valve, pin 84 is located beneath the centerline of tube 41 ensuring that the bypass valve is locked in position until the control knob is rotated in the opposite direction.

It will be obvious from the above description that the present invention provides a new and improved bypass and hard water mixing valve. Further, it will be obvious from the above description that the valve disclosed herein is considerably easier to operate as compared to multiple valve devices previously used.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. The device is designed to operate with a water softener; however, the device may be used for other purposes.

The invention claimed is:

1. A bypass and hard water mix valve comprising:
a main body having an inlet passage with a first end connectable to a source of hard water and a second end connectable to a water softening means, said main body further having an outlet passage connectable to said water softening means and an intermediate passage leading from said inlet passage between said first end and second end to said outlet passage;
bypass valve means slidably mounted in said intermediate passage being operable to move from a closed position whereat water flows from said inlet passage through said water softening means and out said outlet passage to an open position whereat all water flowing into said inlet passage from said first end is directed through said intermediate passage to said outlet passage; and,
hard water mix valve means movably mounted in said intermediate passage and operably associated with said bypass valve means to release controlled portions of water from said inlet passage through said intermediate passage to said outlet passage when said bypass valve is in said closed position, 2. The valve of claim 1 wherein:
said bypass valve means includes a tube defining a hard water mix passage leading from said inlet passage to said outlet passage;
said hard water mix valve means includes a headed valve extending into and movable relative to said mix passage.

3. The valve of claim 2 and further comprising:
spring means mounted in said main body and in contact with said headed valve normally urging said headed valve to close said mix passage limiting water flow therethrough.

4. The valve of claim 3 wherein:
said hard water mix valve means includes a control mounted to said main body and extending externally thereof, said control is movable to move said headed valve relative to said mix passage allowing water flow therethrough.

5. The valve of claim 2 wherein said bypass valve means includes first sealing means mounted to said tube, said tube is spaced apart from said main body forming a bypass passage, said sealing means engaging said main body around said bypass passage limiting flow therethrough when said bypass valve means is in said closed position and further engaging said main body at said inlet passage limiting flow therethrough when said bypass valve means is in said open position directing flow from said inlet passage through said bypass passage to said outlet passage.

6. The valve of claim 5 wherein:
said bypass valve means includes an external control engaged with said tube to control movement thereof.

7. The valve of claim 5 wherein:
said first end of said inlet passage is offset from said second end of said inlet passage.

8. The valve of claim 7 and further comprising:
spring means mounted in said main body and in contact with said headed valve normally urging said headed valve to close said mix passage limiting water flow therethrough.

9. The valve of claim 7 wherein:
said hard water mix valve means includes a control mounted to said main body and extending externally thereof, said control is movable to move said headed valve relative to said mix passage allowing water flow therethrough.

10. The valve of claim 2 wherein said bypass means includes a shaft rotatably mounted to said main body, said shaft has a pin mounted thereto extending slidably into said tube and positioned off center relative to said shaft locking said shaft in one of said open position and said closed position when said shaft is rotated to an opposite extreme and against internal fluid pressures.

11. A water valve comprising:
a main body with a first water inlet, a first water outlet, a second water inlet, a main outlet, a first water passage leading from said first water inlet to said first water outlet, a second water passage leading from said second water inlet to said main outlet, and a bypass passage leading from said first water passage to said second water passage;
a bypass valve including a hollow tube with a first seal at one end thereof, said tube slidably mounted in said bypass passage and movable from a closed position whereat said seal engages said main body at said bypass passage and allowing water flow out said first water outlet and into said second water inlet to said second water outlet to an open position whereat said seal engages said main body at said first water passage interrupting flow through said first water outlet and directing flow to said bypass passage; and,
a mix valve slidably mounted in said tube and movable, when said tube is in said closed position, from a sealing postion interrupting flow through said tube to an unsealed position directing a portion of water in said first water passage through said tube.

12. The valve of claim 11 wherein:
said first water inlet is a hard water inlet, said first water outlet is a hard water outlet, said first water passage is a hard water passage, said second water passage is a soft water passage, said second water inlet is a soft water inlet;
said tube has a second seal at an end opposite said one end, said second seal engages said body at said soft water passage when said bypass valve is in said open position interrupting flow through said soft water inlet and directing flow from said bypass passage into said soft water passage.

13. The valve of claim 12 wherein said mix valve includes a stem extending through said tube and a valve head attached to said stem, said tube includes a valve seat at said one end engaged by said valve head when said mix valve is in said sealing position.

14. The valve of claim 13 and further comprising:

spring means positioned between said mix valve and said bypass valve normally urging said valve head against said valve seat; and, adjustable control means projecting from and mounted to said main body operably associated with said spring means to move said valve head on and off said valve seat controlling movement of flow through said tube.

15. The valve of claim 11 wherein said bypass valve includes a shaft rotatably mounted to said main body, said shaft has a pin mounted thereto extending slidably into said tube and positioned off center relative to said shaft locking said shaft in one of said open position and said closed position when said shaft is rotated to an opposite extreme and against internal fluid pressures.

* * * * *